(12) United States Patent
Bussit et al.

(10) Patent No.: US 9,127,712 B2
(45) Date of Patent: Sep. 8, 2015

(54) ROLLING BEARING ASSEMBLY DEVICE FOR STEERING COLUMN

(71) Applicants: Sylvain Bussit, Monnaie (FR); Daniel Jansen, Tours (FR); Tommy Jullien, Tours (FR); Thomas Lepine, Villandry (FR); Bruno Montboeuf, Cerelles (FR)

(72) Inventors: Sylvain Bussit, Monnaie (FR); Daniel Jansen, Tours (FR); Tommy Jullien, Tours (FR); Thomas Lepine, Villandry (FR); Bruno Montboeuf, Cerelles (FR)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/260,600

(22) Filed: Apr. 24, 2014

(65) Prior Publication Data

US 2014/0321780 A1    Oct. 30, 2014

(30) Foreign Application Priority Data

Apr. 23, 2013  (FR) ...................... 13 53669

(51) Int. Cl.
```
F16C 27/00      (2006.01)
F16C 27/06      (2006.01)
B62D 1/16       (2006.01)
F16C 35/073     (2006.01)
F16C 25/08      (2006.01)
F16C 19/16      (2006.01)
```
(52) U.S. Cl.
CPC ............... *F16C 27/066* (2013.01); *B62D 1/16* (2013.01); *F16C 25/083* (2013.01); *F16C 35/073* (2013.01); *F16C 19/163* (2013.01); *F16C 2326/24* (2013.01)

(58) Field of Classification Search
CPC .. F16C 27/066; F16C 2326/24; F16C 25/083; F16C 35/073
USPC .......................... 384/517, 535, 536, 581, 582
See application file for complete search history.

(56) References Cited

U.S. PATENT DOCUMENTS

| | | | |
|---|---|---|---|
| 5,829,891 A | | 11/1998 | Beaman |
| 6,179,473 B1 | * | 1/2001 | Ponson et al. ................. 384/537 |
| 6,375,360 B1 | * | 4/2002 | Weisskopf et al. ........... 384/538 |

FOREIGN PATENT DOCUMENTS

| | | | |
|---|---|---|---|
| DE | 19955643 A1 | * | 5/2001 |
| EP | 1184583 A1 | | 3/2002 |

* cited by examiner

*Primary Examiner* — Phillip A Johnson
(74) *Attorney, Agent, or Firm* — Bryan Peckjian; SKF USA Inc. Patent Dept.

(57) ABSTRACT

The invention provides a rolling bearing assembly device having an inner race, an outer race, at least one row of rolling elements between the inner race and the outer race, and a sleeve mounted in the bore of the inner race. An annular elastic element is mounted axially between a radial bearing flange of the sleeve and the inner race, the elastic element having an inner bore that is able to bear against an outer surface of the sleeve so as to transmit a force having a radial component in the direction of the interior of the device. The sleeve includes at least one slot extending axially towards the inner race from a lower edge of the radial bearing flange, the lower edge being disposed on the opposite side from the inner race.

10 Claims, 3 Drawing Sheets

ROLLING BEARING ASSEMBLY DEVICE FOR STEERING COLUMN

CROSS REFERENCE TO RELATED APPLICATIONS

This is a Non-Provisional Patent Application, filed under the Paris Convention, claims the benefit of France Patent (FR) Application Number 1353669 filed on Apr. 23, 2013 (Apr. 23, 2013), which is incorporated herein by reference in its entirety.

FIELD OF THE INVENTION

The present invention relates to the field of rolling bearing assembly devices, in particular rolling bearing assemblies used in the steering columns of motor vehicles.

BACKGROUND OF THE INVENTION

Generally, steering columns comprise a shaft, one end of which is secured to a steering wheel operated by the driver of the vehicle, and the other end of which is secured to mechanical members intended to angularly position the wheels of the vehicle. The shaft of the steering column is mounted so as to rotate in a tubular housing by way of two rolling bearing assembly devices, each comprising a rolling bearing, generally an angular-contact ball bearing, which are mounted in opposition.

The rolling bearing assembly generally comprises an inner race, an outer race and rolling elements disposed between the races. The rolling bearing assembly is mounted on the housing by its outer race and on the shaft directly or by way of a sleeve or a ring known as a tolerance ring. A sleeve provides the interface between the shaft and the inner race of the rolling bearing and compensates any geometric defects there may be between these two pieces. The sleeve allows the rolling bearing assembly to be mounted easily on the shaft without initial tightness.

However, it is preferable for the assembly to function with zero play between the sleeve and the shaft in order to ensure that the device is kept on the shaft and there is permanent contact between the races and the rolling elements of the rolling bearing assembly.

It is these drawbacks which the invention intends more particularly to address by proposing a new rolling bearing that is particularly economical, is simple to manufacture and to mount, and has an extended service life.

SUMMARY OF THE INVENTION

To this end, the invention relates to a rolling bearing assembly device comprising an inner race, an outer race, at least one row of rolling elements between the inner race and the outer race, and a sleeve mounted in the bore of the inner race.

In accordance with the invention, an annular elastic element is disposed axially between a radial bearing flange of the sleeve and the inner race, the elastic element comprising an inner bore that is able to bear against an outer surface of the sleeve so as to transmit a force having a radial component in the direction of the interior of the device. The sleeve comprises at least one slot extending axially towards the inner race from a lower edge of the bearing flange, the lower edge being disposed on the opposite side from the inner race.

By virtue of the invention, the elastic element bears against the sleeve and against the inner race in order to transmit forces from the sleeve to the races of the rolling bearing assembly and the rolling elements and thus preloading the rolling bearing assembly.

When the elastic element is subjected to a force, it deforms both axially, by compression, resulting in a decrease in its axial dimension, and radially, by an increase in its radial dimension. The radial expansion allows the transmission of a radial component of the force exerted on the elastic element towards the cylindrical portion of the sleeve against which it bears.

The at least one slot provided in the sleeve gives a certain amount of flexibility of the sleeve, which can deform elastically under the radial component transmitted by the preloaded elastic element. The sleeve thus deforms radially in the direction of the rod mounted in the bore of the sleeve.

By virtue of the invention, the cylindrical portion of the sleeve allows the device to be centred and axially guided on the rod and any radial play between the sleeve and the rod is eliminated. In addition, the preload exerted by the elastic element on the inner race is transmitted to the outer race by way of the rolling elements, ensuring the permanent contact thereof.

Furthermore, since the elastic element is annular, the preloading on the sleeve on the one hand and on the inner race on the other hand is distributed uniformly.

Finally, the bulk of the rolling bearing assembly device is limited, since all the elements are included between the lower edge of the flange and the outer race.

According to advantageous but non-obligatory aspects of the invention, such a rolling bearing may include one or more of the following features, in any technically permissible combination:

- The rolling elements are balls.
- The rolling elements are in angular contact with the inner race and the outer race.
- The rolling elements are kept regularly spaced apart circumferentially by a cage, which may be provided with at least one axial portion located radially between the inner race and the outer race.
- At least one axial portion of the cage comprises an axial retention means that engages with at least one of the inner and/or outer races.
- The sleeve comprises an axial cylindrical portion, the lower end of which is extended radially towards the outside of the device by the radial bearing flange.
- The inner race comprises an axial cylindrical portion bearing directly against the axial cylindrical portion of the sleeve.
- The inner race comprises a toric portion that forms, on its outer surface that is concave in axial section, a raceway for the rolling elements, the toric portion bearing directly against the elastic element.
- The outer race comprises an axial cylindrical portion that extends towards the inside of the rolling bearing assembly device by way of a radially directed toric portion, the toric portion forming, on its inner surface that is concave in axial section, a raceway for the rolling elements.
- The outer race comprises a radial edge that extends radially towards the outside of the device from the axial cylindrical portion, so as to engage with a tubular housing and to axially retain the assembly.
- The elastic element is in direct contact with the inner race.
- The elastic element is in direct contact with the sleeve.
- The elastic element comprises an inner bore that is able to bear against the outer surface of the axial cylindrical portion of the sleeve.

The elastic element is annular and, in the free state, has a circular, parallelepipedal or triangular cross section.

The elastic element is an elastic O-ring separate from the sleeve.

The elastic element is overmoulded on the inner race or on the outer surface of the sleeve.

The elastic element is made of synthetic material, for example based on elastomer, such as nitrile rubber, polyurethane, ethylene propylene diene monomer (EPDM), or thermoplastic elastomer (TPE) based on urethane (TPU) or styrene (TPS).

A groove is made on the outer periphery of the cylindrical portion of the sleeve, the groove being approximately consistent in shape with the elastic element.

The sleeve comprises a single slot forming an opening and passing axially through the sleeve.

The sleeve comprises at least two slots that are regularly spaced apart circumferentially.

The at least one slot in the sleeve has a circumferential extent of between 1° and 20°, advantageously between 1° and 5°.

The at least one slot in the sleeve passes radially through the radial bearing flange and a part of the axial cylindrical portion of the sleeve.

The diameter of the outer cylindrical surface of the bearing flange of the sleeve is greater than or equal to the outside diameter of the elastic element in the free state.

The lower edge of the bearing flange of the sleeve is intended to bear against a locking washer.

The lower edge is radial.

The lower edge is provided with a portion that is inclined towards the interior of the rolling bearing assembly device so as to transmit a force having a radial component in the direction of the interior of the device.

The inclined portion of the lower edge of the bearing flange has a toric concave shape.

The invention also relates to a steering column comprising a housing, a shaft and at least one bearing assembly device according to any one of the preceding embodiments, mounted between the housing and the shaft.

BRIEF DESCRIPTION OF THE DRAWINGS

The invention will be better understood and further advantages thereof will become more clearly apparent in the light of the following description of an embodiment of a rolling bearing assembly device according to the principle of the invention, this description being given only by way of example and with reference to the appended drawings, in which.

DETAILED DESCRIPTION OF THE INVENTION

Figure 1:
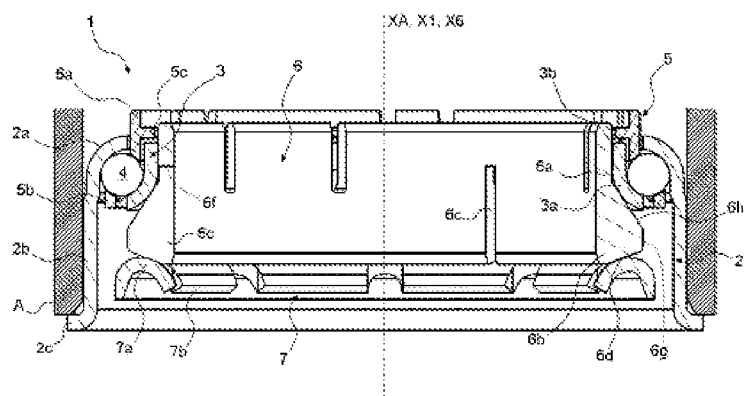
FIG. 1a is a view in axial section of a rolling bearing assembly device according to a first embodiment of the invention.
FIG. 1b is a perspective view of a sleeve according to the first embodiment of the invention.

A rolling bearing assembly device, of central axis X1, referenced 1 in its entirety in FIGS. 1a to 4, is intended to be mounted in a steering column of a motor vehicle, in particular between a tubular housing A, of central axis XA, comprising a bore, and a rotary shaft (not shown). During normal operation, the axes X1 and XA are coincident.

As shown in FIGS. 1a and 1b, a rolling bearing assembly device 1 comprises an inner race 2, an outer race 3, a row of rolling elements 4, in this case balls, a cage 5 for maintaining the circumferential spacing of the rolling elements 4, and a sleeve 6 or tolerance ring mounted in the inner race 3.

In this and the following embodiments, the adjectives "axial" and "radial" and the adverb "axially" are defined with respect to the central axis X1 of the rolling bearing 1, which is a relative rotation axis of the races 2 and 3. Thus, an axial portion or part is parallel to the axis X1, while a radial part or portion is perpendicular to this axis and surrounds it.

The outer race 2 comprises a toric portion 2a, an axial portion 2b and the radial rim 2c. The toric portion 2a is directed radially towards the inside of the device 1 from the axial portion 2b. The toric portion 2a has an inner surface that is concave in axial section and forms a raceway for the rolling elements 4. The radial rim 2c is directed radially towards the outside of the device 1 from the axial portion 2b so as to engage with the tubular housing A and axially retain the assembly.

The inner race 3 comprises a toric portion 3a and an axial cylindrical portion 3b. The toric portion 3a forms, on its outer surface that is concave in axial section, a raceway for the rolling elements 4. The raceways of the inner race 3 and outer race 2 are disposed on either side of a radial plane that passes through the centre of the rolling elements. The rolling bearing assembly device 1 affords angular contact for the rolling elements 4, thereby providing the ability to react axial load in one direction and radial load in the other direction.

The inner race 3 and outer race 2 may be produced from a portion of tube or from a piece of sheet metal, for example by cutting and pressing.

The cage 5 comprises an axial annular portion 5a of small diameter that passes between the free end of the toric portion 2a of the outer race 2 and an outer surface of the axial cylindrical portion 3b of the inner race 3. The axial annular portion 5a extends axially beyond the axial ends of the inner race 3 and is provided with a plurality of radial protuberances 5c that extend towards the sleeve 6 so as to axially retain the elements of which the rolling bearing is made.

The cage 5 also comprises an annular portion 5b of large diameter that is disposed on the opposite side and passes between the free end of the toric portion 3a of the inner race 3 and an inner surface of the axial cylindrical portion 2b of the outer race 2.

The cage 5 may be made from a synthetic material, for example a polyamide possibly reinforced with a mineral filler.

The sleeve 6 is of central axis X6, which is coincident with the axes X1 and XA during normal operation, and comprises an axial cylindrical portion 6a and a radial bearing flange 6b. The axial cylindrical portion 6a is disposed so as to bear directly against the bore of the axial cylindrical portion 3b of the inner race 3. The axial cylindrical portion 6a is also disposed around the driving shaft in its inner bore, thereby axially centring the rolling bearing and the shaft with respect to the sleeve 6. The radial bearing flange 6b extends radially towards the outside of the device 1 from one end of the axial cylindrical portion 6a.

The bearing flange 6b of the sleeve comprises a lower edge 6d that bears against a locking washer 7 which transmits an axial force onto the sleeve 6. According to the example illustrated in FIGS. 1a and 1b, the lower edge 6d is radial. This locking washer 7 axially retains the rolling bearing assembly device 1 and comprises an annular part 7a that has a concave shape in axial section, and the upper outer surface of which bears against the lower edge 6d of the sleeve 6. The locking washer 7 is provided with a plurality of tabs 7b that extend radially towards the inside from the annular part 7a. The tabs 7b are approximately oblique and intended to flex elastically when the locking washer 7 is fitted onto the shaft and, through bracing against the shaft, prevent any axial movement of the locking washer 7 along the shaft in the opposite direction to the direction in which it was fitted.

In accordance with the invention, the sleeve 6 also comprises slots 6c that extend axially towards the inner race 3 from the lower edge 6d, disposed on the opposite side from the inner race 2, of the bearing flange 6b, as far as a radial edge 6f of the axial cylindrical portion 6a. The slots 6c pass radially through the bearing flange 6b and a part of the axial cylindrical portion 6a of the sleeve 6. Such slots 6c give a certain amount of flexibility to the sleeve 6, which can deform elastically under a radial load.

Figure 2:
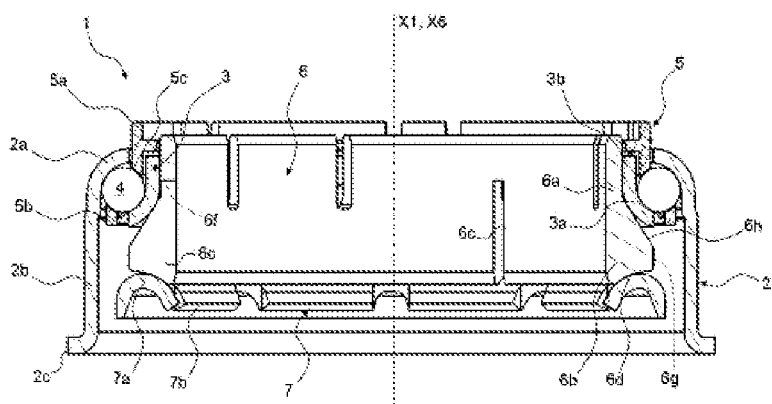
FIG. 2 is a view in axial section of a rolling bearing assembly device according to a second embodiment of the invention.

In the example illustrated in FIGS. 1 and 2, the sleeve 6 comprises three slots 6c that are regularly spaced apart circumferentially and have a circumferential extent of 5°.

In accordance with the invention, the rolling bearing assembly device 1 also comprises an elastic element 8 engaging with the sleeve 6 and able to exert an axial preloading force that is transmitted to the inner race 3. The elastic element 8 is annular and is mounted axially between the radial bearing flange 6b of the sleeve 6 and the toric portion 3a of the inner race 3. The radial bearing flange 6b of the sleeve 6 circumferentially bears axially against the elastic element 8.

The sleeve 6 also comprises a groove 6e on the outer periphery of the axial cylindrical portion 6a, the groove 6e being consistent in shape with the elastic element 3, so that it is axially kept around the sleeve 6. The elastic element 8 comprises an inner bore that continuously bears around its entire circumference against the bottom of the groove 6e in the axial cylindrical portion 6a of the sleeve 6.

In the examples illustrated in FIGS. 1a to 4, the elastic element 8 is annular, toric and has a circular cross section in the free state. The outside diameter of the elastic element 8 in the free state is equal to the diameter of the outer cylindrical surface 6g of the bearing flange 6b of the sleeve 6.

The elastic element 8 is made of synthetic material, for example based on elastomer, such as nitrile rubber, polyurethane, ethylene propylene diene monomer (EPDM), or thermoplastic elastomer (TPE) based on urethane (TPU) or styrene (TPS).

When the elastic element 8 is subjected to an axial load by way of the locking washer 7 and the flange 6b of the sleeve 6, it transmits an angular force towards the toric portion 3a of the inner race 3. This angular force is subsequently transmitted towards the rolling elements 4 and the outer race 2, thereby preloading the rolling bearing assembly 1 and preventing any internal play and ensuring permanent contact between the elements.

Under this force, the elastic element 8 deforms both axially, by compression between the radial bearing flange 6b and the inner race 3, resulting in a decrease in its axial dimension, and radially, by an increase in its radial dimension. The radial expansion of the elastic element 8 allows the transmission of a radial component of the force exerted on the elastic element 8 towards the axial cylindrical portion 6a of the sleeve 6 against which it bears.

By virtue of the flexibility of the sleeve 6, this flexibility being obtained by the slots 6c, the sleeve 6 deforms elastically under the radial component transmitted by the preloaded elastic element 8. The sleeve 6 thus deforms radially in the direction of the rod mounted in the bore of the sleeve 6, thereby making it possible to prevent any radial play between the sleeve and the rod and to ensure that the device 1 is kept axially on the rod.

Figure 3:
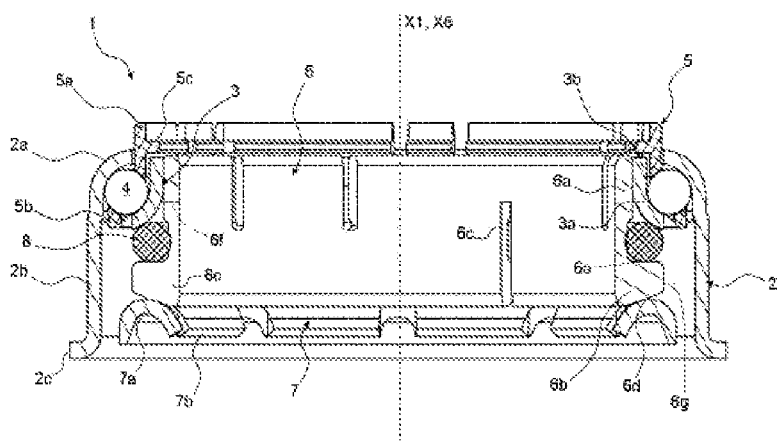
FIG. 3 is a view in axial section of a rolling bearing assembly device according to a third embodiment of the invention.

A second embodiment and a third embodiment that are illustrated respectively in FIGS. 2 and 3, in which identical elements have the same references, differ from the first embodiment only by way of the shape of the lower edge 6d of the radial bearing flange 6b of the sleeve 6.

As illustrated in FIG. 2, the lower edge 6d of the radial bearing flange 6b of the sleeve 6 is provided with a portion that is inclined towards the interior of the rolling bearing assembly device 1.

When the device 1 is preloaded, the locking washer 7 exerts a force on the sleeve 6 as a result of its bearing against the lower edge 6d. The elastic element 8 transmits a radial component of the force to the sleeve 6, as explained above in a manner. In addition, on account of the shape inclined towards the interior of the lower edge 6d, a radial component is transmitted directly to the radial bearing flange 6b, which deforms it elastically towards the interior of the device 1.

The combined forces of the radial force exerted by the deformation of the elastic element 8 and the radial force transmitted directly to the sleeve allows the sleeve to be held more effectively on the rod.

As illustrated in FIG. 3, the lower edge 6d of the radial bearing flange 6b of the sleeve 6 is provided with a portion that is inclined towards the interior of the rolling bearing assembly device 1, the inclined portion having a toric concave shape.

This toric concave shape of the lower edge 6d is approximately consistent in shape with the annular portion 7a of the locking washer 7 so as to ensure a better circumferential distribution of the forces while ensuring constant contact between the locking washer 7 and the sleeve 6.

Figure 4A:
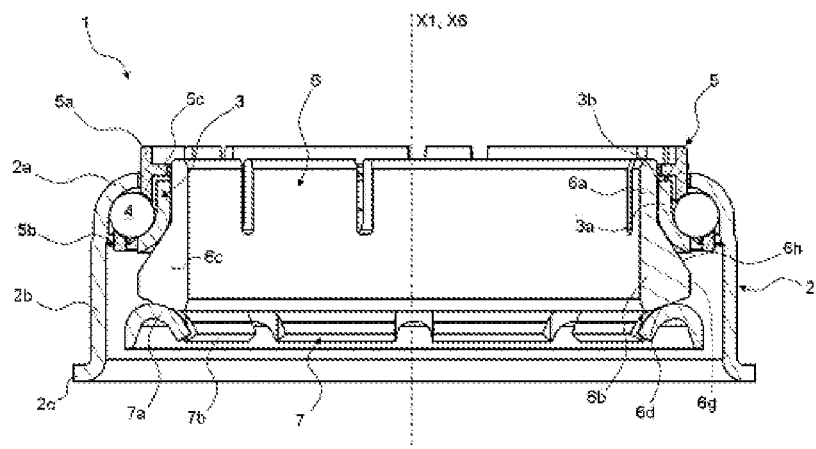
FIG. 4a is a view in axial section of a rolling bearing assembly device according to a fourth embodiment of the invention.
Figure 4B:
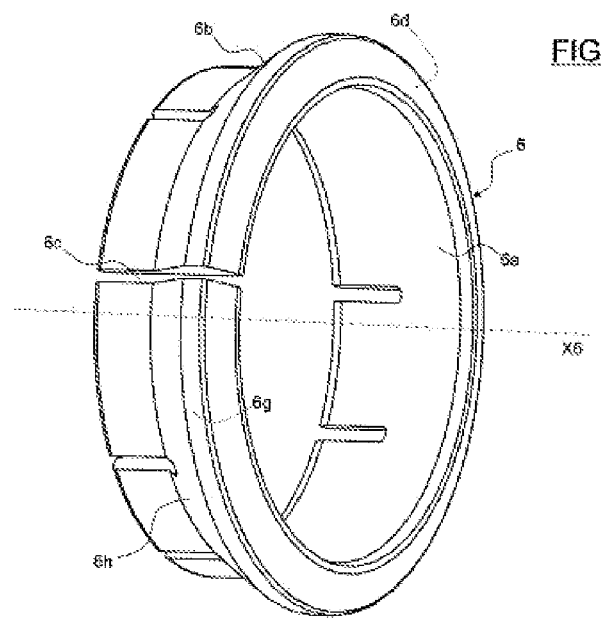
FIG. 4b is a perspective view of a sleeve according to the fourth embodiment of the invention.

A fourth embodiment illustrated in FIGS. 4a and 4b, in which identical elements have the same references, differs from the embodiments described above in that the sleeve 6 has a single slot 6c.

The single slot 6c forms an opening in the sleeve 6, passing both axially and radially through the sleeve in a given angular position. Such a single slot 6c makes it possible to do away with a plurality of slots as described in the previous embodiments, while ensuring, by itself, the elastic deformation of the sleeve 6.

The technical features of the embodiments and variants envisaged above may be combined with one another.

The invention claimed is:

1. A rolling bearing assembly device comprising:
   an inner race,
   an outer race,
   at least one row of rolling elements disposed between the inner race and the outer race, and
   a sleeve mounted in the bore of the inner race, wherein
   an annular elastic element is mounted axially between a radial bearing flange of the sleeve and the inner race, the elastic element having an inner bore that is able to bear against an outer surface of the sleeve to transmit a force having a radial component in the direction of the interior of the device, and wherein
   the sleeve provides at least one slot extending axially towards the inner race from a lower edge of the radial bearing flange, the lower edge being disposed on the opposite side from the inner race.

2. The device according to claim 1, wherein the at least one slot in the sleeve forms an opening passing axially through the sleeve.

3. The device according to claim 2, wherein the sleeve provides at least two slots that are regularly spaced apart circumferentially.

4. The device according to claim 3, wherein the at least one slot in the sleeve has a circumferential extent of between 1° and 20°.

5. The device according to claim 4, wherein the elastic element is able to bear against an axial cylindrical portion of the sleeve.

6. The device according to claim 5, wherein the lower edge of the radial bearing flange of the sleeve is radial and bears against a locking washer.

7. The device according to claim 5, wherein the lower edge of the radial bearing flange of the sleeve bears against a locking washer and is provided with an inclined portion so as to transmit a force having a radial component in the direction of the interior of the device.

8. The device according to claim 7, wherein the elastic element is an elastic O-ring separate from the sleeve.

9. The device according to claim 7, wherein the elastic element is overmoulded on the inner race or on the outer surface of the sleeve.

10. A steering column comprising:
a housing,
a shaft, and
at least one rolling bearing assembly device mounted between the housing and the shaft and providing;
  an inner race,
  an outer race,
  at least one row of rolling elements disposed between the inner race and the outer race, and
  a sleeve mounted in the bore of the inner race, wherein
  an annular elastic element is mounted axially between a radial bearing flange of the sleeve and the inner race, the elastic element having an inner bore that is able to bear against an outer surface of the sleeve to transmit a force having a radial component in the direction of the interior of the device, and wherein
  the sleeve provides at least one slot extending axially towards the inner race from a lower edge of the radial bearing flange, the lower edge being disposed on the opposite side from the inner race.

* * * * *